Sept. 24, 1935.  H. J. WHEELER  2,015,299
CENTERING DEVICE FOR CORN CUTTING MACHINES
Filed July 30, 1932   2 Sheets-Sheet 1
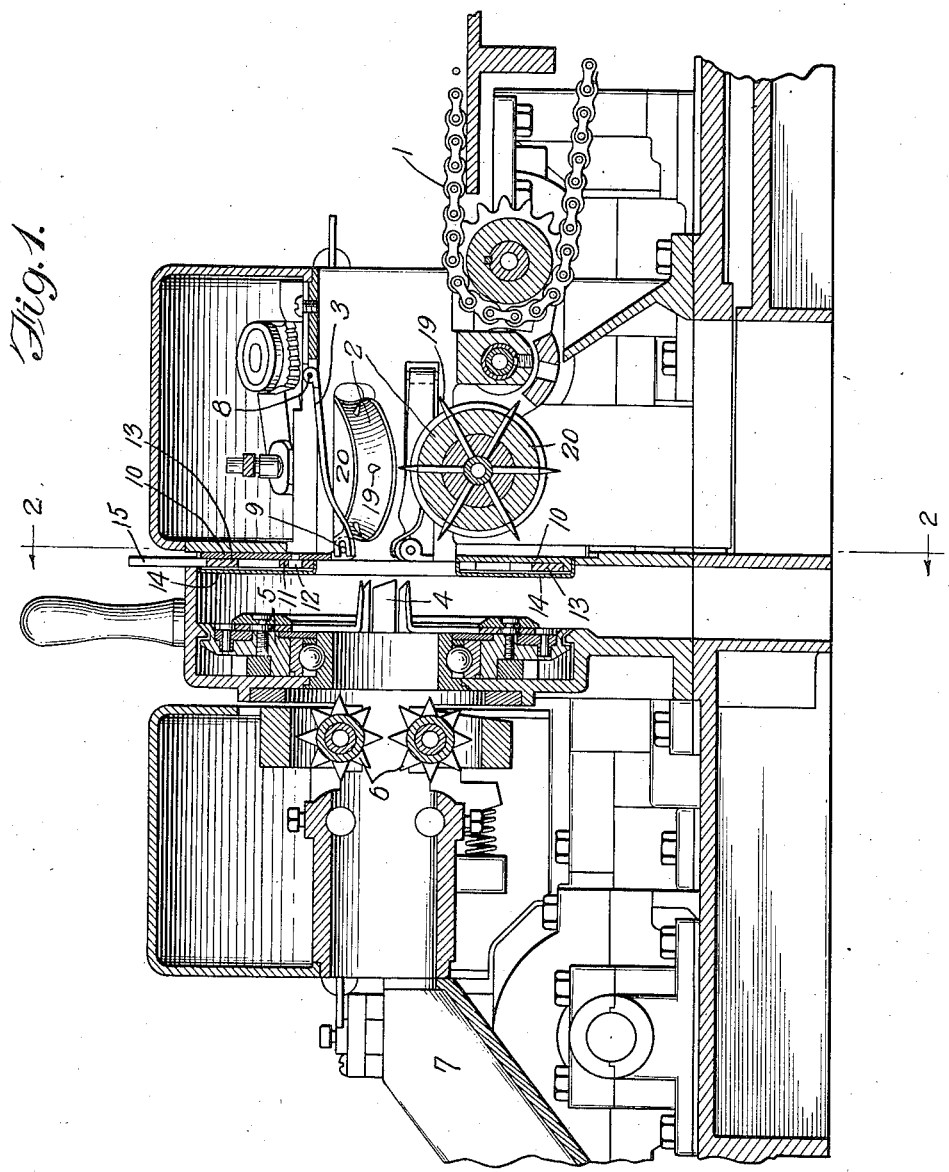

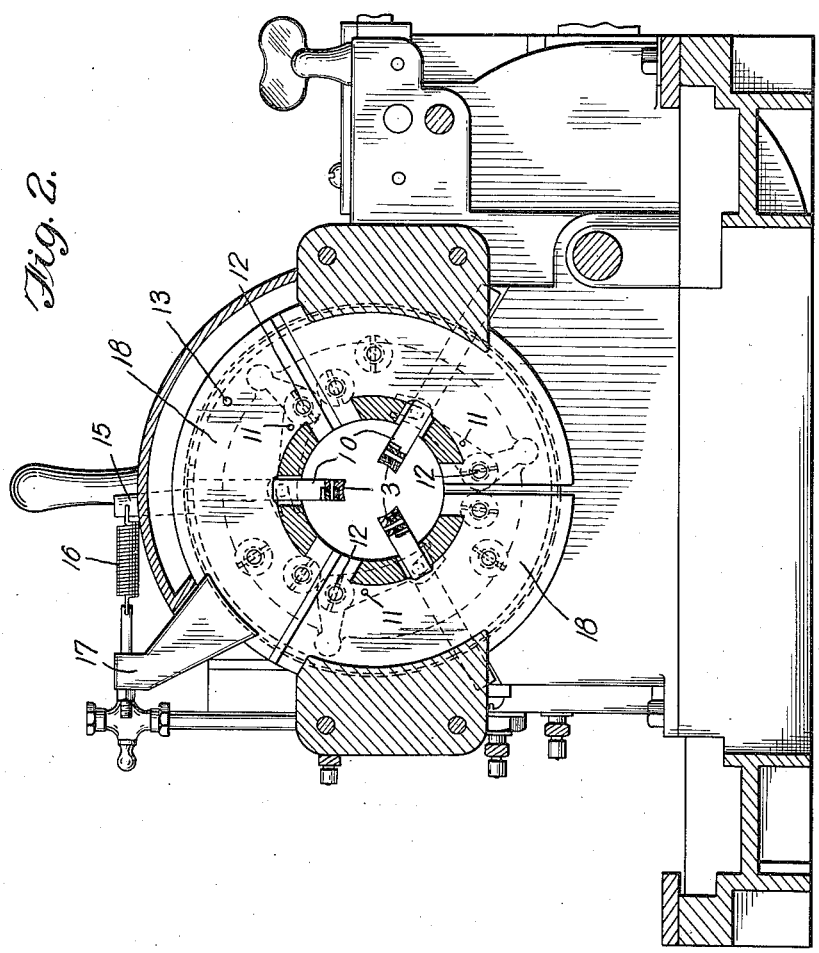

Patented Sept. 24, 1935

2,015,299

UNITED STATES PATENT OFFICE 2,015,299

CENTERING DEVICE FOR CORN CUTTING MACHINES

Henry J. Wheeler, Buffalo, N. Y., assignor to Food Machinery Corporation, San Jose, Calif., a corporation of Delaware Application July 30, 1932, Serial No. 626,613

6 Claims. (Cl. 130—9)

This invention relates to an improved centering device for use with green corn cutting machines and is especially adapted to center and guide the tip ends of the husked ears as they are presented to cutting heads for cutting the kernels therefrom.

Centering devices heretofore have been only partly efficient and reliable due almost entirely to the manner of mounting them in relation to the movement of the ears of corn, and this is especially true where the cutter heads for removing the kernels from the cobs, are of the rotary type.

The rotary type of cutter head revolves at a relatively high speed and in order to cut efficiently the ears must be presented to the cutter knives with their axes in line with the center of rotation and be quite accurately held in that position during their entry and passage through the cutting operation. The ears must also be held against rotation during the cutting operation or the forward movement of the ears relative to the revolving cutters will be thrown more or less out of line and either imperfect work result or the ears will be twisted to such an extent as to cause a jam or clogging of the machine.

In order also to have a centering and guiding device for the ears of corn that will accommodate itself to all sizes and shapes of ears as they come from the field it has been found that a new and distinct kind of mounting and control of the guide members must be developed, which will at the same time, guide, center and help prevent rotation of the ear as it contacts with the rapidly revolving cutters.

Some ears of corn have a rather blunt tip while others have a more tapering tip, and it is this constant change and difference in the shape of the tip of the ear that has caused more or less trouble with past centering devices, because in order to accommodate the different shapes of ears the guide members had to extend out from the head support a sufficient distance to permit of some taper being given to them and this forward extension has tended to set up twisting and side strains in the mechanism that has been very hard to overcome.

In order to have the guide members function properly it is necessary that they present a conical opening for the tip of the ear to enter. The angle of the cone can be determined for a general condition only, so that it might be said to be only a compromise and so shaped as to accommodate the varying tapers of the ears as nearly as possible with a fixed, or substantially fixed angle.

It is also necessary and desirable to have the guide members connected in some manner so that all move uniformly from the center as they are expanded by the entering ear of corn, otherwise the axis of the ear would be thrown out of line with the center line of travel and the tip would not enter the circle of the rotating cutters in a proper manner with the result that there would either be a jam or a portion of the cob would be cut away with the kernels and consequently the kernels would not be cut off at their bases when it is desired to cut whole kernels.

In the cutting of whole grain kernels where they are cut as closely to the cob as possible so as to retain the germ in the end of the kernel, it is more than ever necessary that the centering of the ear be as perfectly done as possible and further that the centered position be maintained during the entire period of cutting with each ear, otherwise the whole kernels will be cut short in some places and too long in others and with scrapings from the cobs which results in mixing with the cut product chaff and portions of cobs which must be removed in future manipulations of the cut product.

Also in the cutting of what is known in the trade as "Cream Style Corn", wherein the tops of the kernels are first cut off and then the balance of the kernels down to the cob cut off it is highly desirable that all of the cut kernels are of uniform size and shape in order to grade high in the market. Here again it is highly desirable and necessary that the ears be properly centered and guided during the cutting operation, otherwise uniformity of product will be impossible and as a result it will be graded lower in quality and price, which is a direct loss to the canner.

Applicant's improvement depends almost entirely in the manner of mounting and controlling the centering and guiding members so that the twisting strains encountered just as the ear enters the zone of the rotating cutters, are resisted in a manner that does not tend to bind the movement of the mechanism operative from the movement of the guide members.

As far as applicant is aware this method of mounting and controlling of the guide and centering members has never before been applied to corn cutters and it is therefore a step in advance in the art of cutting green corn.

Briefly applicant's improved method of mounting and controlling the guide and centering members of a corn cutter comprising substantially the following method.

There is an equalizing head carrying a ring member; pivoted rocker arms and radial slide members. One end of each rocker arm engages with the ring member and the other end of each rocker arm engages with one of the radial slide members, so that as the slide members are moved radially the rocker arms will all move in unison and therefore the inner ends of the radial slide members will always move in exact relation with the center of the head.

The guide and centering members proper are pivoted at their outer ends to the frame of the machine, while their inner ends have pivotal connection with the inner ends of the radial slide members.

This construction and manner of mounting is quite novel and highly efficient. In all previous centering and guide members they have been rigidly mounted to the ends of either radial slide members or to rocker arms, in which case the outer unsupported ends of the guide members first contacted with the oncoming ear, and due to the resistance of the moving parts more or less lateral or side strains were introduced into the mechanism, destroying its sensitiveness and making the movements sluggish.

The lateral or side strains introduced into these parts after the ear had entered the revolving cutters has been sufficient at times to almost negative their operation and has resulted in very inefficient work.

By pivoting the guide and centering members to the solid frame work of the machine there are no protruding unsupported ends to be twisted out of line and cause a cramping of the mechanism, and then by pivoting the inner ends of the members to the radial slide members there are practically no side strains transmitted to the slides with the result that the parts of the equalizing head always move freely and unobstructed by the strains and twists imparted to other heads.

The guide members so mounted maintain the sensitiveness of the head mechanism so that the guides open freely and easily when the tip of the ear enters and there is no abrasion or mutilation of the tops of the kernels as is the case in past mechanism for this purpose. Instead of the tip of the ear pushing against the guide members and exerting a pushing effect thereto, the movement of the ear produces a pulling effect on the outer pivots of the guide members and causes them to swing away from the ear and thereby move the radial slides uniformly and freely and maintain their centering adjustment without any strains whatever.

It is therefore an object of the invention to provide a centering and ear guiding device for green corn cutters wherein the moving parts are so mounted and controlled that side twists and lateral strains are absorbed by the frame of the machine and not transmitted to the moving mechanism.

It is also an object of the invention to provide a centering and ear guiding device for green corn cutters having a plurality of members positioned to form a conical guide opening and having their outer ends supported against changes of location.

It is also an object of the invention to provide a centering and ear guiding device for green corn cutters having a plurality of radially movable control and supporting members having pivotal connection with a plurality of guide members.

It is also an object of the invention to provide a centering and ear guiding device for green corn cutting machine wherein a series of guide and centering devices are positioned to form a conical opening for the reception of the ends of ears of corn and having their outer ends secured against change of location and their inner ends mounted for change of location whereby the conical opening changes angularly as an ear of corn enters and passes therethrough.

It is a further object of the invention to provide an ear centering and guide device having a plurality of centering and guide members mounted in an equalizing head and having connections whereby the movement of one part will cause the other parts to move in unison therewith and thereby maintain the assembly always in a centered relation.

It is also an object of the invention to provide an ear centering and guide device for green corn cutting machines wherein a plurality of guide members are pivoted at both ends one of which is fixed and the other movable and having other devices coacting therewith so that each member of the assembly will move in unison with all other members.

It is a further object of the invention to provide an ear centering and guide device for green corn cutting machine having a plurality of pivoted centering members, a plurality of radially disposed slide members, a plurality of rocker arms and a single ring member to which said rocker arms are connected and which causes the entire assembly to move in unison and maintain an ear of corn in a truly centered and aligned position during the cutting of the kernels therefrom.

With such objects in view as well as other advantages inherent in the invention, consisting in the parts and combinations hereinafter set forth and claimed, it is understood that the several necessary parts and combinations constituting the same may be varied in their proportions, placement and general arrangement without departing from the scope and nature of the invention, and in order to make the invention more clearly understood there are shown in the accompanying drawings, in somewhat of a diagrammatical manner, means and mechanism for placing the same in concrete form without limiting the improvements to the exact construction chosen to illustrate the invention.

It should be mentioned that the drawings are not necessarilly made to scale, some of the parts may be somewhat exaggerated as to size or location to better illustrate the operative functions of the apparatus.

With this understanding of the illustrative part of the invention we may proceed with a more detailed description wherein like characters represent like parts in the several views.

Figure 1 is a vertical sectional elevation of a commercial green corn cutter with the improved centering and guide device attached.

Figure 2 is a vertical plan section taken on substantially the line 2—2 of Figure 1 and shows a portion of the equilizing head frame broken away to show the rocker arms and the equilizing ring members more clearly.

While the improvements have been shown in connection with a certain type of green corn cutter having a rovolving head cutting device it is to be understood that the device is equally applicable to any type of machine adapted to the cutting of green corn from the cobs. Neither is its application limited to the types of machine employing rotating cutter heads. All machines adapted for cutting green corn from the cobs must have a centering and guide device and this improvement is applicable to any of these as well as the type shown in the drawings.

It seems unnecessary to do more than just refer briefly to the general construction of the machine embodying this invention.

In practically all of these types of machines the husked ears of corn are laid on a feed chain 1, which carries the point of the ear forward until it is engaged by the first set of feed rolls 2, and just about the time the feed rolls 2 engage the ear the point is entering into the conical opening formed by the centering and guide members 3, which center the ear and guide it into the rotating cutters 4 carried by the rotary head 5, which cutters remove the kernels from the cob and as the cob advances it is engaged by another set of feed rolls 6 which pull it through the cutters and discharge it into the chute 7. Since these elements are only used in combination with the invention further description is not needed.

The guide members 3 and the centering head with which they operate being the essence of this invention the remainder of the description will be confined to them.

The drawings show three of the centering and guide members 3 but it is to be understood that any number desired may be used.

The outer ends of the guide and centering members 3 are pivoted to the machine frame at 8 and have no movement relative thereto except pivotal. The inner ends of the centering and guide members 3 have pivotal connection at 9 with the inner ends of the radial slide members 10 and have expanding movement as the ear of corn enters the cone formed by the members 3 when in their closed position. On account of the centering and guide members 3 having pivotal connection at 8 with the frame there are no strains or twists whatever imparted to the slides 10 when an ear of corn expands the members 3 and thereby moves the slides 10 radially according to the size and shape of the ear.

Each slide 10 has pivotal connection with a rocker arm 11, pivoted in turn on the head member at 12. The outer end of the rocker arm 11 has pivotal connection with an equalizing ring 13 mounted for rotary movement in the head member 14. An arm 15 integral with the ring 13 is attached to a tension spring 16 which in turn is adjustably secured to an arm 17 fixed against movement. It can now be seen that when the centering and guide members 3 are expanded by a passing ear of corn the three slides 10 will be moved in their ways and on account of the pivotal connections with the rocker arms 11 and their pivotal connection with the ring 13 that the entire assembly will move as a unit, in other words all of the slides 10 will move uniformly and the center of the ear will be held in line with the center of rotation of the cutter head so that the kernels will be cut uniformly from the cobs. The tension spring 16 tending to maintain a constant predetermined tension on the centering assembly so that it will immediately close to its smallest opening the instant an ear passes out of contact with the centering members 3 and thereby be in position and ready to center and guide the next oncoming ear. Cover plates 18 are provided to hold the slides 10, rocker arms 11 and ring member 13 in proper operative relation and by removal of a plate the slide or rocker arm thereunder can easily be removed for replacement or inspection.

The manner of pivoting the centering and guide members 3 permits making these members long and the conical opening formed thereby of a longer and more gradual taper to contact with more of the outer surface of the kernels and thereby greatly reduce the possibility of mashing or in any manner injuring the delicate surfaces of the kernels as they are rapidly pushed through the guide members and into the operative zone of the cutters 4, and since there are no side or lateral strains transmitted to the equalizing mechanism it moves freely with only the resistance of the spring 16 to overcome. Ears of green corn centered and guided by this mechanism do not have the kernel skins broken or damaged in the least while passing therethrough.

The instant the point of the ear enters the cutters it is subjected to a considerable twisting strain since the start of the cut tends to turn the ear and of course some substantial means must be provided to absorb this twist and hold the ear straight and true in its path. This turning tendency is resisted principally by the spurs 19 on the feed rollers 20, but is also resisted to some extent by the centering and guide members 3, and since these members are pivoted to the solid frame of the machine at their outer ends none of the twisting strain is transmitted to the slides 10 or any of the equalizing mechanism, and the pivotal connection with the slides 10 makes the movements of the members 3 ideal under factory operating conditions, in fact it might well be said that the centering and guide members 3 are mounted for universal operative conditions and will handle any size or shape ear of corn in a highly efficient manner as compared with previous devices.

Having described my invention what I claim as new and desire to secure by Letters Patent is:

1. An apparatus for cutting green corn comprising a frame work, ear feeding means, kernel cutting means and guide and centering means, the guide and centering means including a plurality of members having their outer ends pivoted to said frame work and their inner ends pivoted to an equalizing means said equalizing means including a yielding device and radial slide members, said yielding device tending to hold said centering members in a predetermined neutral position.

2. An apparatus for cutting green corn from the cob comprising ear feeding means, kernel cutting means, a frame work for maintaining said means in operative relation, a centering and guide means including an equalizing head having a ring member, rocker arms and radial slide members and a yielding device for holding said several means in restrained positions, the centering and guide means having pivotal connection to said frame work and to said radial slide members whereby said centering and guide means are given swinging movement by a passing ear of corn and said equalizing means are given movement against the resistance of said yielding device.

3. An apparatus for cutting green corn from the cob comprising a frame work, ear feeding means, kernel cutting means and a centering and guide means, said centering and guide means including a plurality of flat members, pivotal means for securing one end of said members to said frame work to hold them against axial movement, an equalizing assembly including radial slide members, pivotal means for connecting said slide members with the free ends of said centering and guide members, yielding means for holding said slide members in a restrained position and means for causing all of said slide members to move radially in unison.

4. An apparatus for cutting green corn from the cob comprising a frame work, ear feeding means, kernel cutting means and an ear centering and guide means, said centering and guide means including a plurality of flat elongated members positioned circumferentially around the axial movement of an ear of corn, pivotal means for connecting one end of said centering members to said frame work, an equalizing device including a plurality of radial slide members, pivotal means for connecting the free ends of said centering members to said radial slide members and yielding means for holding said radial slide members in a restrained position whereby a passing ear of corn will move said centering and guide members against the resistance of said yielding means.

5. An apparatus for cutting green corn from the cobs comprising a frame work, ear feeding means, kernel cutting means and centering and guide means, said centering and guide means including a plurality of members arranged to form an opening through which an ear of corn is passed by said feeding means, equalizing means for imparting a uniform movement to said plurality of members and yielding means for holding said equalizing means in a restrained position, said centering and guide means comprising a plurality of substantially flat elongated members, pivotal connections for the outer ends of said guide means and pivotal means connecting the inner ends of said guide means with said equalizing means.

6. An apparatus for cutting green corn from the cob comprising a frame work, ear feeding means, kernel cutting means, a centering and guide means assembly including a series of circumferentially disposed members, pivotal means for securing one end of said centering members to said frame work, and equalizing assembly means including radially slidable, rocking and rotary elements with pivotal connection on said slidable elements for the opposite ends of said centering means with yielding means connected to said rotary element for holding said assembly in a restrained neutral position.

HENRY J. WHEELER.